United States Patent
Vageline (10) Patent No.: US 7,373,433 B2
(45) Date of Patent: May 13, 2008

(54) APPARATUS AND METHOD TO PROVIDE FAILOVER PROTECTION IN AN INFORMATION STORAGE AND RETRIEVAL SYSTEM

(75) Inventor: Michael P. Vageline, Tuscon, AZ (US)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 10/971,801

(22) Filed: Oct. 22, 2004

(65) Prior Publication Data

US 2006/0101201 A1   May 11, 2006

(51) Int. Cl.
*G06F 13/10* (2006.01)
*G06F 11/07* (2006.01)

(52) U.S. Cl. ............... 710/14; 710/8; 710/74; 714/6; 711/112

(58) Field of Classification Search ............ None
See application file for complete search history.

(56) References Cited

U.S. PATENT DOCUMENTS

| | | |
|---|---|---|
| 5,437,022 A | 7/1995 | Beardsley et al. |
| 5,574,950 A | 11/1996 | Hathorn et al. |
| 5,870,537 A | 2/1999 | Kern et al. |
| 6,006,342 A | 12/1999 | Beardsley et al. |
| 6,014,669 A | 1/2000 | Slaughter et al. |
| 6,304,980 B1 | 10/2001 | Beardsley et al. |
| 6,470,397 B1 | 10/2002 | Shah et al. |
| 2003/0005202 A1 | 1/2003 | Bakke et al. |
| 2003/0046474 A1 | 3/2003 | Craddock et al. |
| 2003/0050990 A1 | 3/2003 | Craddock et al. |
| 2003/0105852 A1 | 6/2003 | Das et al. |
| 2003/0126315 A1* | 7/2003 | Tan et al. ............... 710/1 |
| 2003/0182592 A1 | 9/2003 | Massa et al. |

* cited by examiner

*Primary Examiner*—Ilwoo Park
(74) *Attorney, Agent, or Firm*—Quarles & Brady, LLP; Dale F Regelman (57) ABSTRACT

A method is disclosed for failover protection in an information storage and retrieval system comprising two clusters, two device adapters, and a plurality of data storage devices. The method provides a first device driver for a first device adapter and a second device driver for a second device adapter, and disposes those device drivers in both clusters. The method then places in operation the first device driver disposed in a first cluster, places in operation the second device driver disposed in a second cluster, and places in a standby mode the first device driver disposed in the second cluster. The method detects a failure of the first cluster, followed by a failure of the second device adapter. The method then makes operational the first device driver disposed in the second cluster, and continues to access information stored in the plurality of data storage devices using the first device adapter, and the first device driver disposed in the second cluster.

35 Claims, 9 Drawing Sheets

APPARATUS AND METHOD TO PROVIDE FAILOVER PROTECTION IN AN INFORMATION STORAGE AND RETRIEVAL SYSTEM

FIELD OF THE INVENTION

This invention relates to an apparatus and method to provide failover protection in an information storage and retrieval system.

BACKGROUND OF THE INVENTION

Data storage and retrieval systems are used to store information provided by one or more host computer systems. Such data storage and retrieval systems receive requests to write information to one or more secondary storage devices, and requests to retrieve information from those one or more secondary storage devices. Upon receipt of write request, the system stores information received from a host computer in a data cache. In certain implementations, a copy of that information is also stored in a nonvolatile storage device. Upon receipt of a read request, the system recalls information from the one or more secondary storage devices and moves that information to the data cache. Thus, the system is continuously moving information to and from storage devices, and to and from the data cache.

Many data processing applications require what is sometimes referred to as "24/7/365" operational capabilities, i.e. the data storage and retrieval systems are optimally continuously in operation. In order to provide such "24/7/365" operational capabilities, some information storage and retrieval systems comprise multiple clusters. What is needed is a method to provide failover protection in a multi-cluster information storage and retrieval system after the failure of one cluster and after the subsequent failure of a device adapter disposed in the operational cluster.

SUMMARY OF THE INVENTION

Applicants' invention comprises an information storage and retrieval system which comprises a plurality of data storage devices; a first device adapter interconnected with that plurality of storage devices; a second device adapter interconnected with that plurality of storage devices; a first cluster comprising a first processor, a first data cache, an operational device driver for that first device adapter, and a standby device driver for that second device adapter; a second cluster comprising a second processor, a second data cache, an operational device driver for that second device adapter, a standby device driver for said first device adapter; and a Remote I/O network interconnecting the first cluster, the second cluster, the first device adapter, and the second device adapter.

Applicants' invention further comprises a method for failover protection in Applicants' information storage and retrieval system. Applicants' method provides a first device driver for a first device adapter and a second device driver for a second device adapter, and disposes those device drivers in both clusters. The method then places in operation the first device driver disposed in a first cluster, places in operation the second device driver disposed in a second cluster, and places in a standby mode the first device driver disposed in the second cluster.

Subsequently, Applicants' method detects a failure of the first cluster, followed by a failure of the second device adapter. The method then makes operational the first device driver disposed in the second cluster, and continues to access information stored in the plurality of data storage devices using the first device adapter and the first device driver disposed in the second cluster.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in data processing system comprising two clusters, two device adapters, and one storage device loop. The following description of Applicant's apparatus and method is not meant, however, to limit Applicant's invention to any particular data processing system, as the invention herein can be applied to providing failover protection for data storage systems in general.

Figure 1:
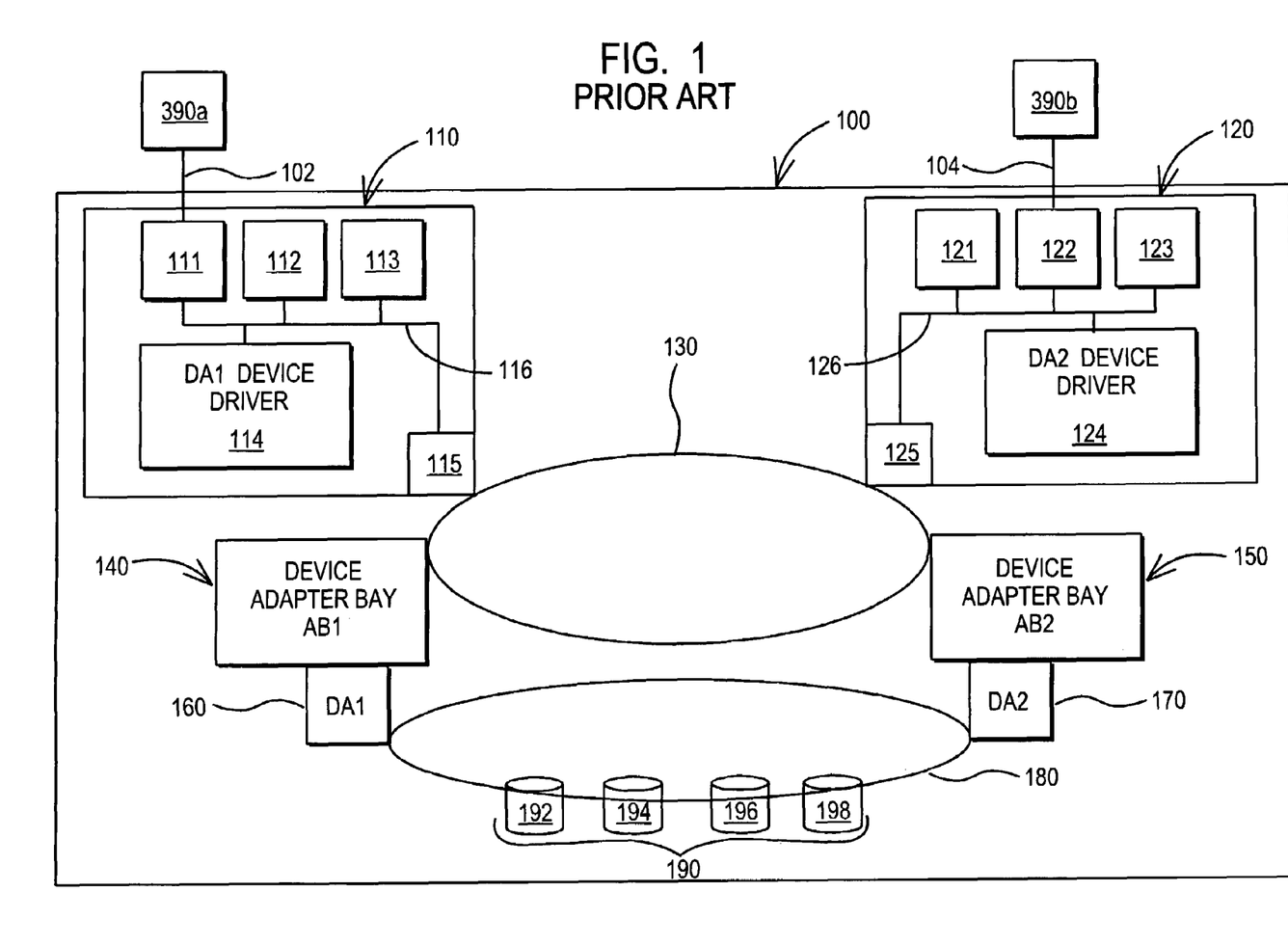
FIG. 1 is a block diagram of a prior art information storage and retrieval system.

Referring now to FIG. 1, prior art information storage and retrieval system 100 comprises a first cluster 110, second cluster 120, first device adapter bay 140, second device adapter bay 150, communication bus 130, device loop 180, and a plurality of data storage devices 190. Communication bus 130 interconnects cluster 110, cluster 120, device adapter bay 140 which comprises device adapter 160, and device adapter bay 150 which comprises device adapter 170. Device loop 180 interconnects device adapter 160, device adapter 170, and plurality of data storage devices 190.

Cluster 110 further comprises processor 111, data cache 112, DA1 device driver 114, I/O bridge 115, I/O bus 116, and optionally nonvolatile storage ("NVS") 113. I/O bus 116 interconnects processor 111, data cache 112, device driver 114, I/O bridge 115, and optionally NVS 113.

I/O bus 116 can take on a variety of forms. In certain embodiments, I/O bus 116 comprises a PCI bus which supports a parallel data, multi-drop I/O adapter environment over short distances of generally less than one foot. In other embodiments, I/O bus 116 transmits data serially, supports point-to-point topologies, and can span distances of a kilometer or more. I/O bridge 115 interfaces I/O bus 116 bus with communication bus 130. I/O processor 111 and device adapter 160 manage the flow of data to and from data cache 112, control the I/O devices 190, and perform data protocol translation where required.

Cluster 120 further comprises processor 121, data cache 122, DA2 device driver 124, I/O bridge 125, I/O bus 126, and optionally nonvolatile storage 123. I/O bus 126 interconnects processor 121, data cache 122, device driver 124, I/O bridge 125, and optionally NVS 123.

I/O bus 126 can take on a variety of forms. In certain embodiments, I/O bus 126 comprises a PCI bus which supports a parallel data, multi-drop I/O adapter environment over short distances of generally less than one foot. In other embodiments, I/O bus 126 transmits data serially, supports point-to-point topologies, and can span distances of a kilometer or more. I/O bridge 125 interfaces I/O bus 126 bus with communication bus 130. I/O processor 121 and device adapter 170 manage the flow of data to and from data cache 122, control the I/O devices 190, and perform data protocol translation where required.

Figure 2A:
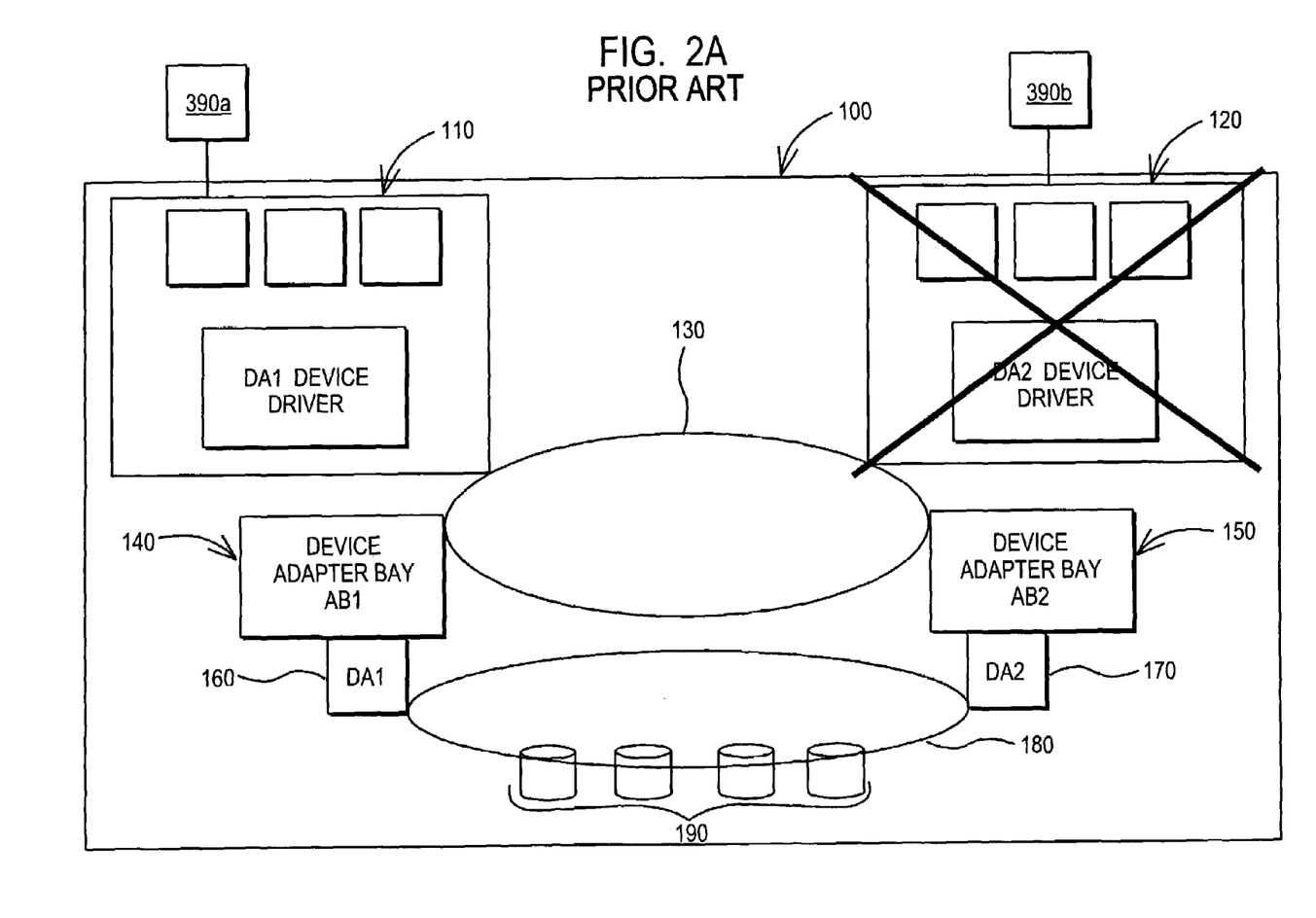
FIG. 2A is a block diagram of the prior art system of FIG. 1 showing the failure of a cluster.

Referring now to FIG. 2A, in the event one of the clusters in system 100 fails, such as for example cluster 120, then no information can be written to, or read from plurality of storage devices 190 using that failed cluster. The remaining operational cluster, such as in the illustrated embodiment of FIG. 2A cluster 110, can still write data to, and/or read data from, plurality of data storage devices 190.

Figure 2B:
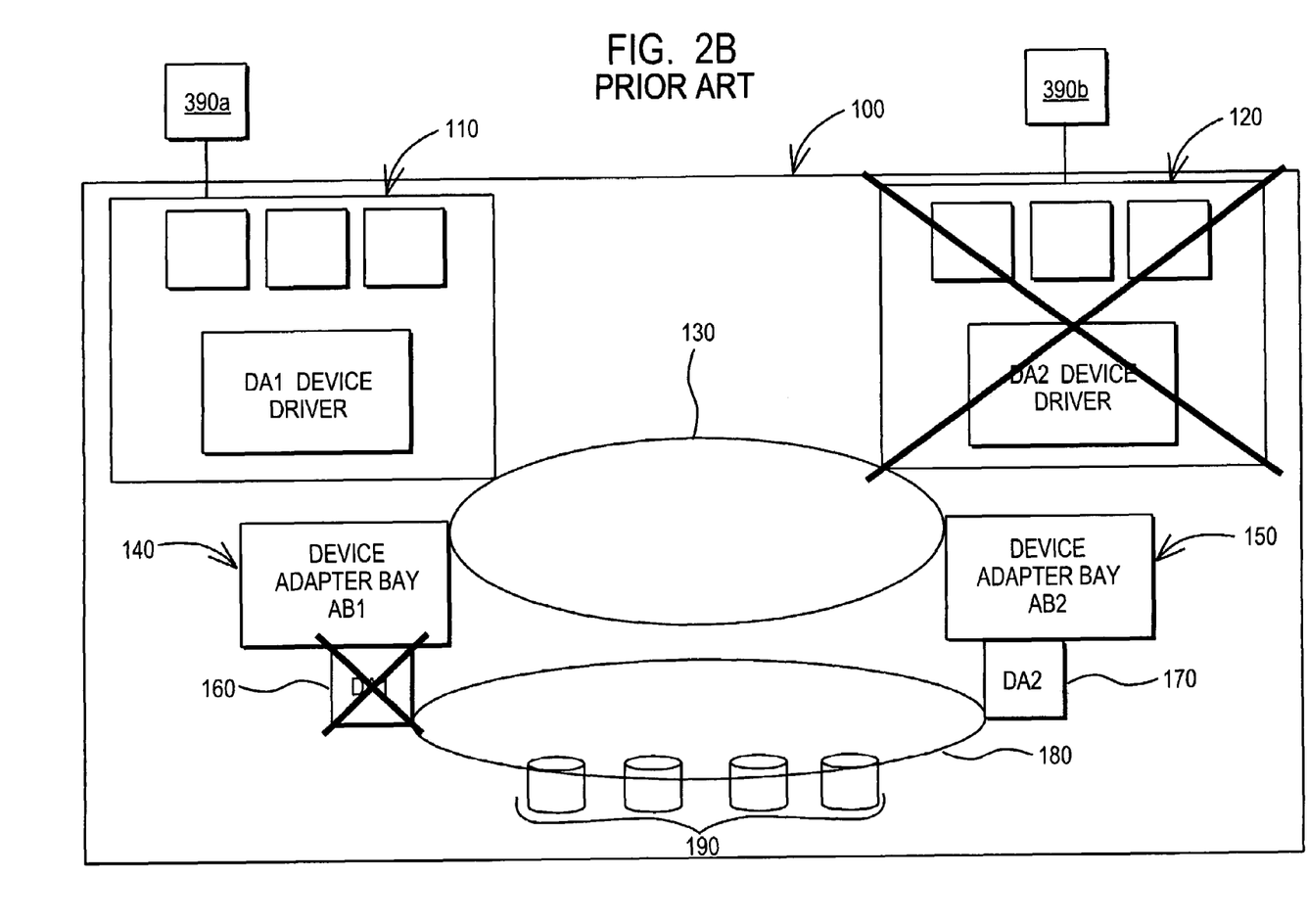
FIG. 2B is a block diagram of the prior art system of FIG. 1 showing the failure of a cluster in combination with the failure of a device adapter.

Referring to FIG. 2B, in the event a first cluster, such as cluster 120, disposed in system 100 fails, and then the device adapter, such as device adapter 160, disposed in the second cluster also fails, then data can not be written to, or read from, the plurality of storage devices 190.

Figure 3:
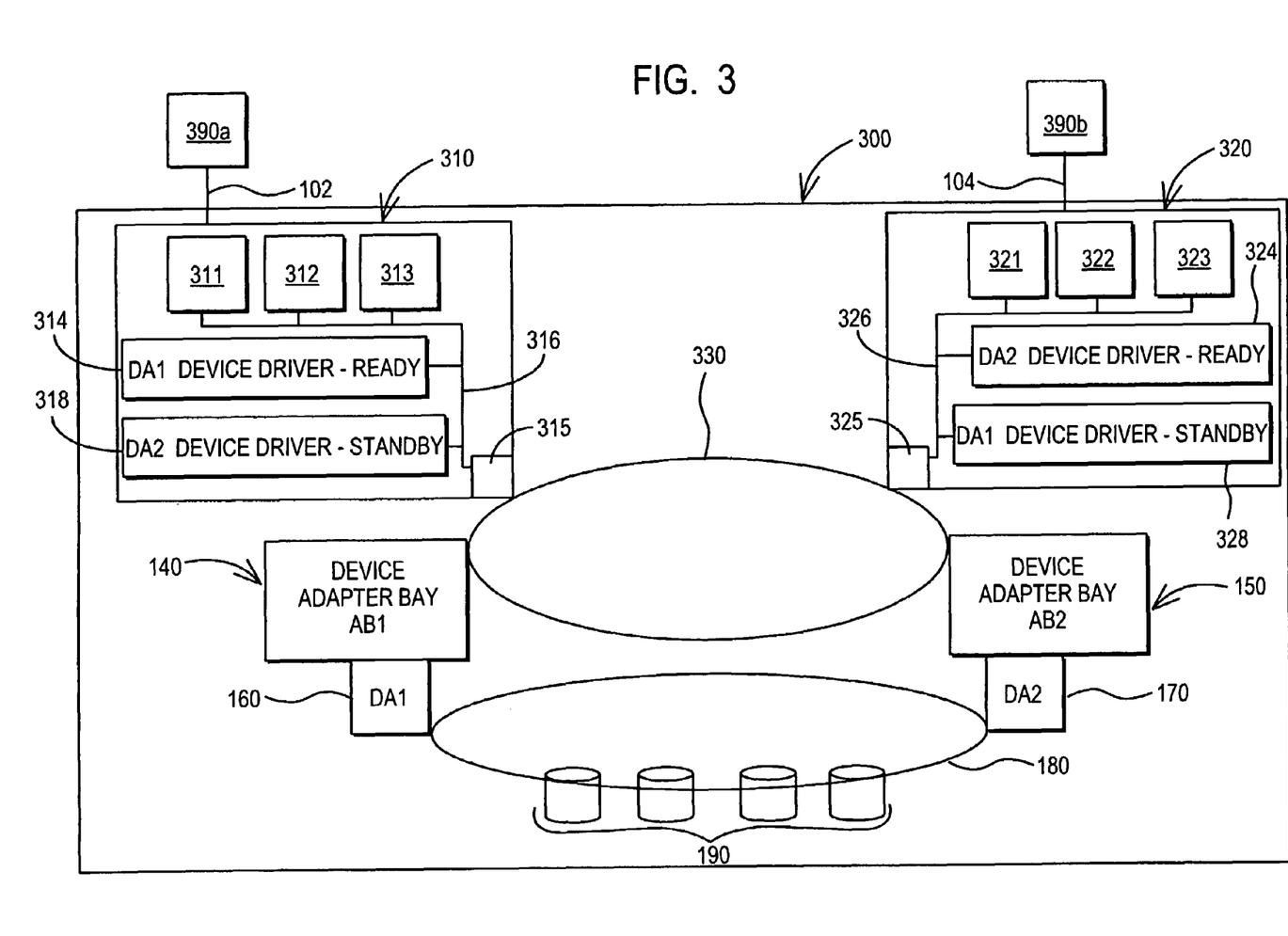
FIG. 3 is a block diagram of Applicants' information storage and retrieval system.

Referring now to FIG. 3, Applicants' information storage and retrieval system 300 comprises a first cluster 310, second cluster 320, first device adapter bay 140, second device adapter bay 150, remote I/O network 330, device loop 180, and a plurality of data storage devices 190. Remote I/O ("RIO") network 330 interconnects cluster 310, cluster 320, device adapter bay 140 which comprises device adapter 160, and device adapter bay 150 which comprises device adapter 170. Device loop 180 interconnects device adapter 160, device adapter 170, and plurality of data storage devices 190. In certain embodiments, device loop 180 comprises a Fibre Channel Arbitrated Loop.

Cluster 310 further comprises processor 311, data cache 312, I/O bridge 315, I/O bus 316, and optionally nonvolatile storage 313. Cluster 310 further comprises a device adapter driver 314, i.e. DA1 Device Driver, for device adapter 160 disposed in Device Adapter Bay 140, wherein that first device adapter driver 314 is operational. Cluster 310 further comprises a device adapter driver 318, i.e. DA2 Device Driver, for device adapter 170 disposed Device Adapter Bay 150, wherein that second device adapter driver 318 is not operational but is placed in a standby mode. I/O bus 316 interconnects processor 311, data cache 312, device driver 314, device driver 318, I/O bridge 315, and optionally NVS 313.

References herein to a device driver being "operational" or placed in an "operational mode," mean that the device driver has been loaded, initialized, and configured. By "configuring" a device driver, Applicants mean setting up the interface between the device driver, such as device driver 314, and adapter itself, where the PCI configuration space of the adapter is read/written, and where memory addresses are exchanged between the device driver and the adapter such that the exchange of commands is then possible.

Reference herein to a "standby" device drive or placing a device driver in a "standby mode," mean that the device driver has been loaded and initialized, but not configured. After the PCI interface is setup, that device driver, and its corresponding device adapter, can service I/O requests. Loading and initializing a device driver may take several milliseconds to several seconds, depending on the system load, while configuring the PCI interface for that device driver takes only about a millisecond. Thus, a "standby" device driver can be made operational within about a millisecond.

Cluster 320 further comprises processor 321, data cache 322, I/O bridge 325, I/O bus 326, and optionally nonvolatile storage 323. I/O bus 326 interconnects processor 321, data cache 322, NVS 323, device driver 324, and I/O bridge 325. Cluster 320 further comprises a first device adapter driver 324, i.e. DA2 Device Driver, for device adapter 170 disposed in Device Adapter Bay 150, wherein that first device adapter driver 324 is operational. Cluster 320 further comprises a second device adapter driver 328, i.e. DA1 Device Driver, for device adapter 160 disposed Device Adapter Bay 140, wherein that second device adapter driver 328 is not operational but is placed in a standby mode, as described above.

In certain embodiments, each group of signals transmitted over RIO network 330 comprises 8 data, 1 clock, and 1 flag line. In certain embodiments, RIO network 330 is capable of transferring data at up to about 500 MBs (unidirectional or bidirectional). RIO network 330 comprises a packet-oriented bus. Link-level flow control is employed with both hardware packet retry and alternate path retry to ensure the reliable delivery of data. Packets range in size from 12 to 276 bytes in length including an 8 to 12 byte header, a 4-byte trailing cyclic redundancy check ("CRC"), and 0 to 260 bytes of data payload. Emphasis is placed on low latency management of I/O operations. Commands have been designed to efficiently perform routine I/O operations such as: programmed I/O (PIO), load and store, interrupt handling, data read/write including options for both ordered and unordered transfers, and cache coordination.

In certain embodiments, at regular intervals controller 311 sends a "heart beat" signal to controller 321. Upon receiving that heart beat signal, controller 321 sends a responding heart beat signal to target controller 311. As long as a processor in a first cluster receives a heart beat signal from the controller in the neighboring cluster within a defined heart beat response interval, both controllers determine that the neighboring cluster is operational. On the other hand, if controller 311, for example, does not receive a responding heart beat signal from controller 321 within the heart beat response interval, then controller 311 determines that cluster 320 is no longer operational, i.e. that cluster 320 has "failed."

In certain embodiments, the heart beat response interval is set by the manufacturer in firmware disposed in each cluster. In certain embodiments, the heart beat response interval is set by the operator of system 300. In certain embodiments, the heart beat response interval is set by one or more interconnected host computers. In certain embodiments, the heart beat response interval is between 100 milliseconds and 5 seconds.

Figure 6:
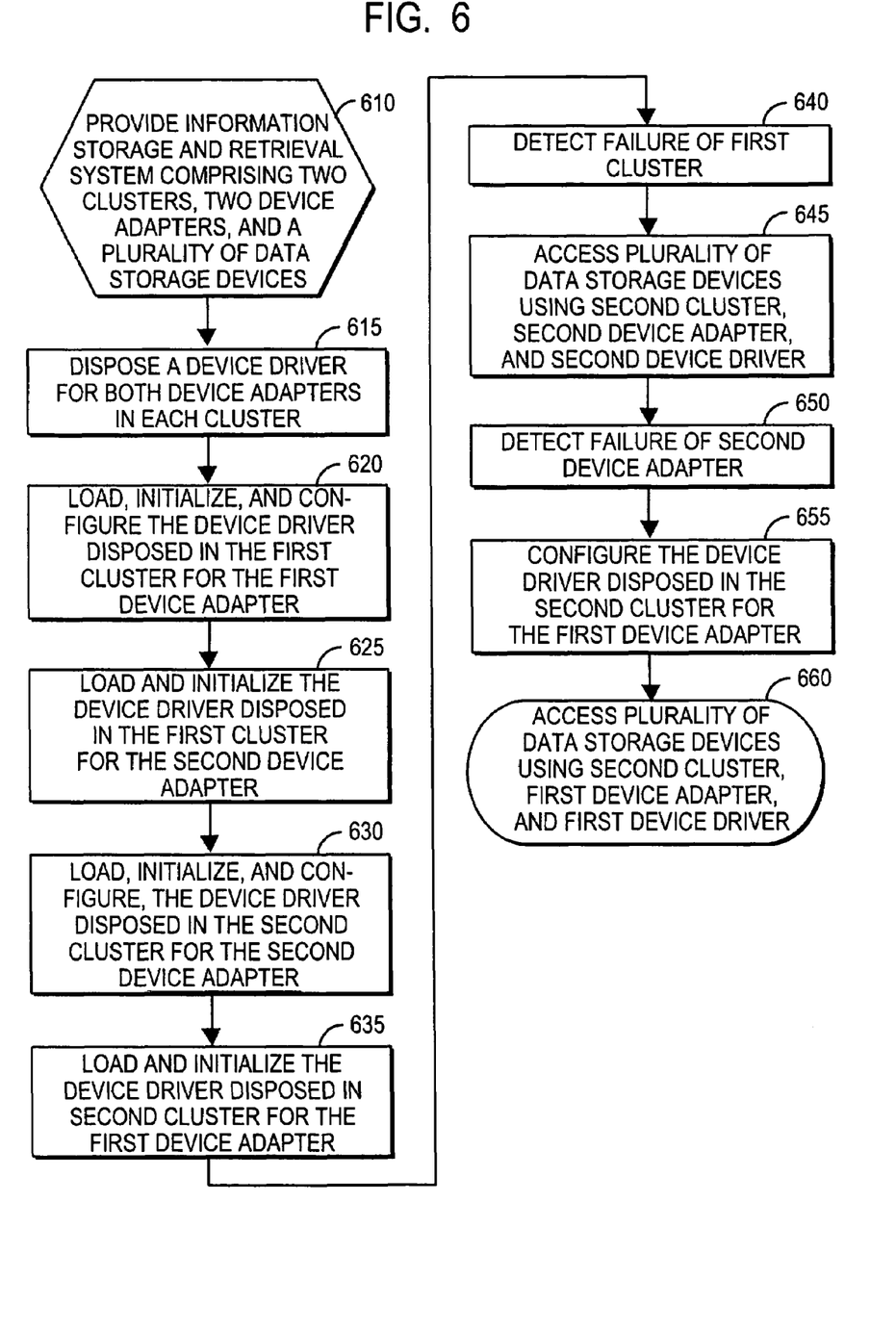
FIG. 6 is a flow chart summarizing the steps of a first embodiment of Applicants' method.

Applicants' invention comprises a method, using Applicants' information storage and retrieval system 300, to provide failover protection during a cluster failure in combination with a device adapter failure. FIG. 6 summarizes the steps of a first embodiment of Applicants' method. Referring now to FIG. 6, in step 610 Applicants' method provides a dual-cluster information storage and retrieval system, such as for example system 300 (FIG. 3), where in addition to two clusters, that system further comprises two or more device adapters, such as for example device adapters 160 and 170, and a plurality of data storage devices, such as for example plurality of data storage devices 190.

In step 615, Applicants' method disposes a device driver for both device adapters in each cluster. In certain embodiments, these device drivers are disposed in RAM disposed in a processor disposed in a first cluster, such as for example processor 311, and in RAM disposed in a processor disposed in the second cluster, such as for example processor 321. In certain embodiments, these device drivers are written to NVS disposed in each cluster, such as for example NVS 313 and NVS 323. In certain embodiments, these device drivers are written to a data cache disposed in each cluster, such as for example cache 312 and cache 322.

In step 620, Applicants' method makes operational the device driver disposed in the first cluster for the first device adapter. In certain embodiments, step 620 comprises loading, initializing, and configuring, that device driver. In certain embodiments, step 620 is performed by a processor, such as processor 311, disposed in the first cluster, such as cluster 310. In certain embodiments, step 620 is performed at system start-up, or upon each system re-start.

In step 625, Applicants' method places the device driver disposed in the first cluster for the second device adapter in a standby mode. In certain embodiments, step 625 comprises loading and initializing, but not configuring, that device driver. In certain embodiments, step 625 is performed by a processor, such as processor 311, disposed in the first cluster, such as cluster 310. In certain embodiments, step 625 is performed at system start-up, or upon each system re-start.

In step 630, Applicants' method makes operational the device driver disposed in the second cluster for the second device adapter. In certain embodiments, step 630 comprises loading, initializing, and configuring, that device driver. In certain embodiments, step 630 is performed by a processor, such as processor 321, disposed in the second cluster, such as cluster 320. In certain embodiments, step 630 is performed at system start-up, or upon each system re-start.

In step 635, Applicants' method places the device driver disposed in the second cluster for the first device adapter in a standby mode. In certain embodiments, step 635 comprises loading and initializing, but not configuring, that device driver. In certain embodiments, step 635 is performed by a processor, such as processor 321, disposed in the second cluster, such as cluster 320. In certain embodiments, step 635 is performed at system start-up, or upon each system re-start.

Steps 620, 625, 630, and 635, may be performed in any order. Steps 620, 625, 630, and 635, may be performed any time after step 615 and prior to step 640.

In step 640, Applicants' method detects a failure of one of the two clusters, such as for example a failure of cluster 320. In certain embodiments, step 640 is performed by a processor, such as processor 311 disposed in the non-failing cluster, such as cluster 310.

Figure 4A:
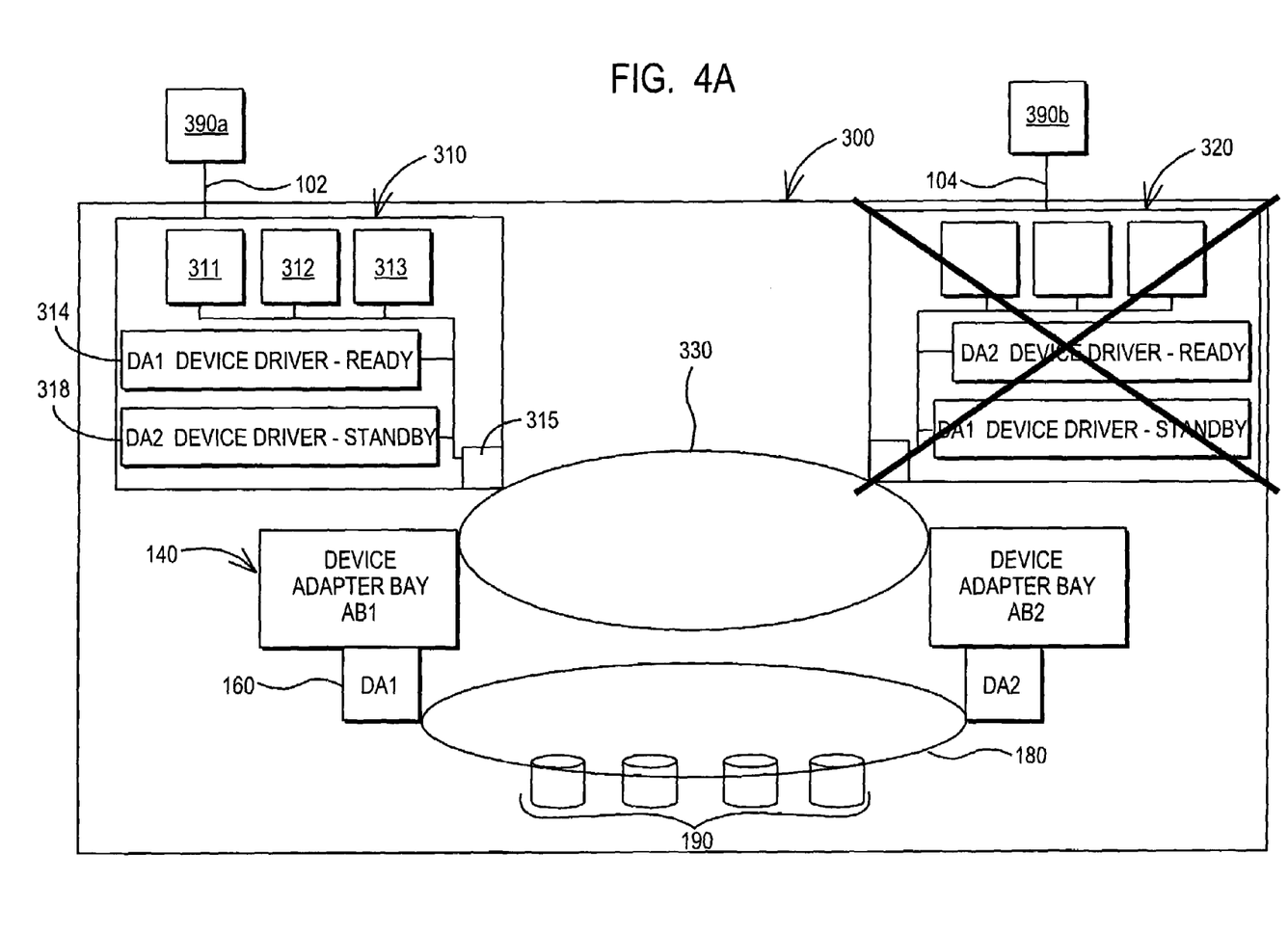
FIG. 4A is a block diagram of the Applicants' system of FIG. 3 showing the failure of a cluster.

Referring now to FIG. 4A, in step 645, after the failure of a first cluster, such as for example cluster 320, Applicants' method accesses the plurality of data storage devices 190 via the operational cluster, such as for example in the illustrated embodiment of FIG. 4A cluster 310, using the first device adapter, such as for example device adapter 160, and the first device driver, such as for example device driver 314.

Figure 4B:
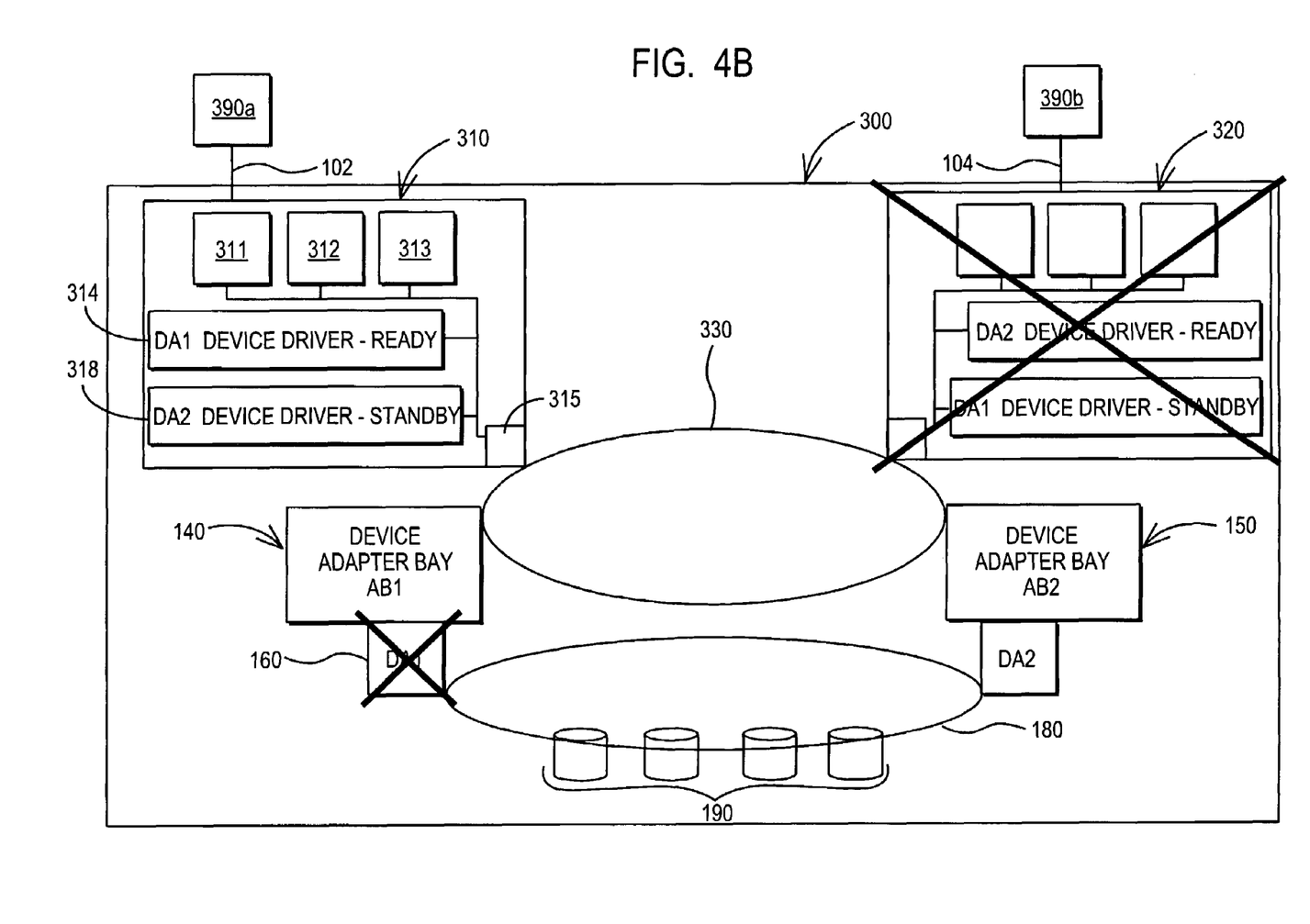
FIG. 4B is a block diagram of the Applicants' system of FIG. 3 showing the failure of a cluster in combination with the failure of a device adapter.

Referring to FIGS. 4B and 6, in step 650, Applicants' method detects a failure of the device adapter, such as for example device adapter 160, disposed in the otherwise operational cluster, such as for example cluster 310. In certain embodiments, step 650 is performed by a processor disposed in the operational cluster, such as for example in the illustrated embodiment of FIG. 4B processor 311.

Figure 5:
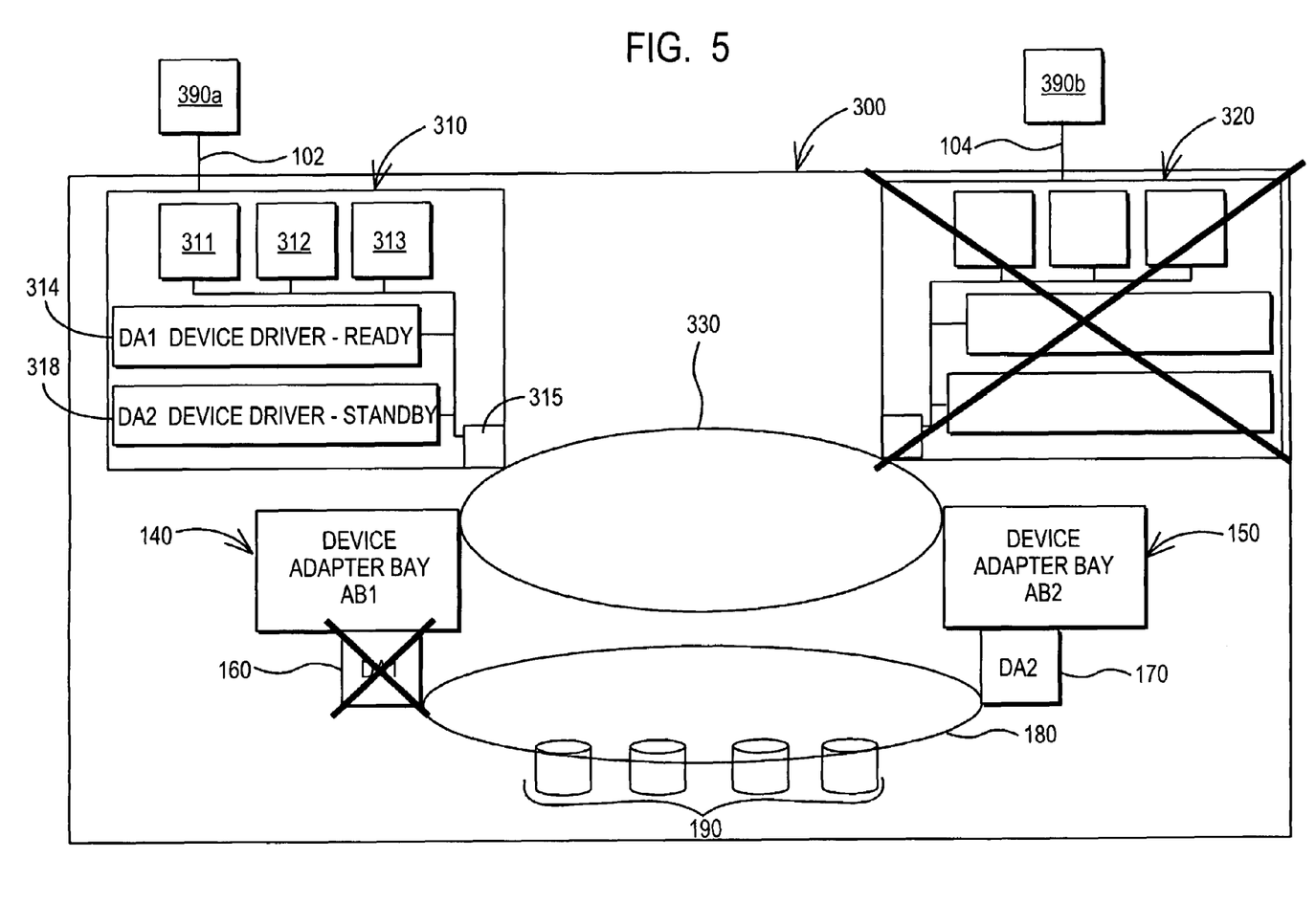
FIG. 5 is a block diagram showing the system of FIG. 4B with reconfigured device drivers.

Referring now to FIGS. 5 and 6, in step 655 Applicants' method makes operational the device driver placed in a standby mode in step 625/635. For example if the failure of cluster 320 is detected in step 640 and the failure of device adapter 160 is detected in step 650, then in step 655 Applicants' method makes operational device driver 318. In certain embodiments, step 655 comprises configuring device driver 318. In certain embodiments, steps 650 and 655 are both performed within a total time of about 1 millisecond. In certain embodiments, step 655 is performed by a processor disposed in the operational cluster, such as for example in the illustrated embodiment of FIG. 4B processor 311.

In step 660, Applicants' method continues to access the plurality of data storage devices using the operational cluster, such as for example in the illustrated embodiment of FIG. 5 cluster 310, device driver 318, RIO network 330, and device adapter 170.

Figure 7:
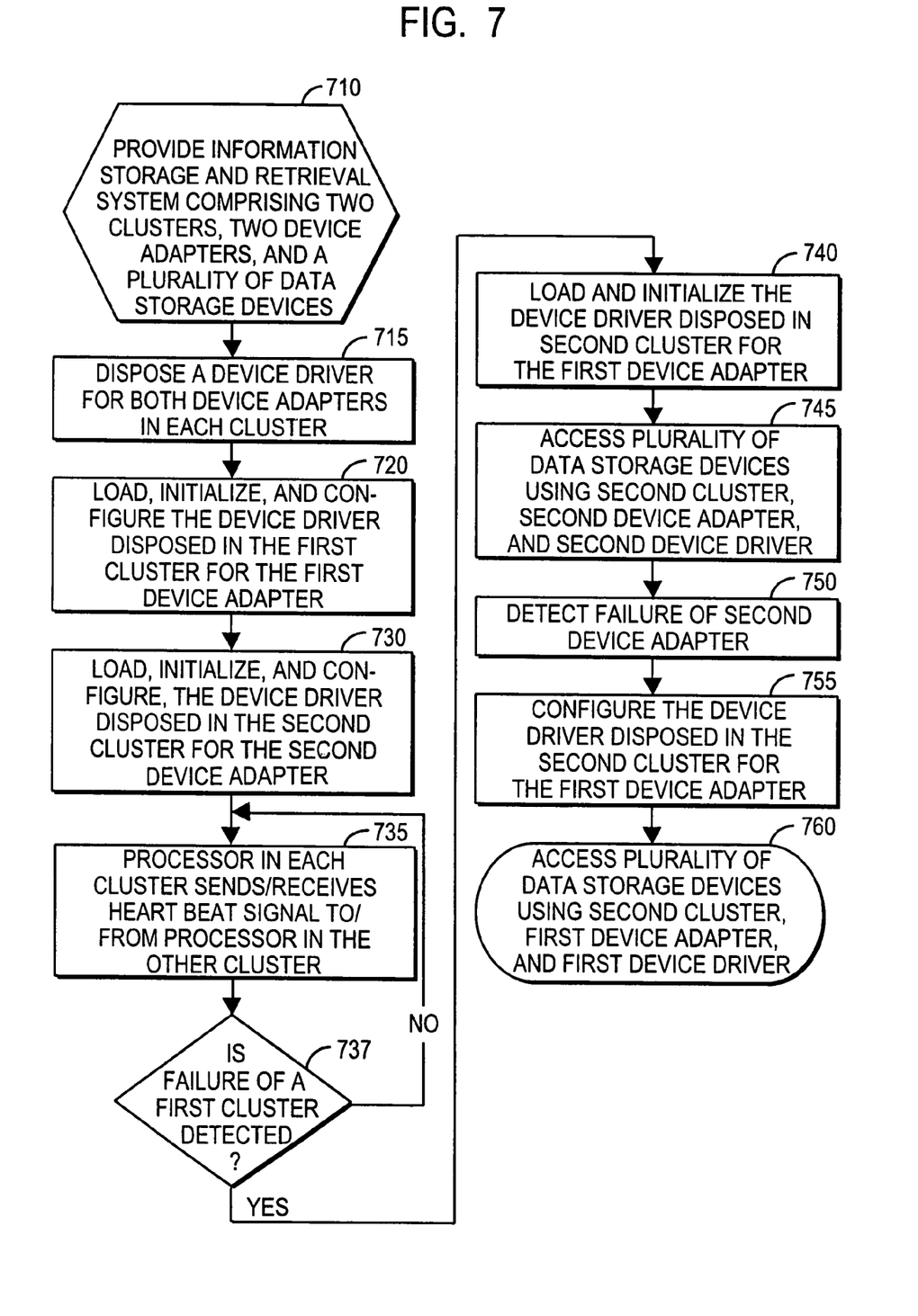
FIG. 7 is a flow chart summarizing the steps of a second embodiment of Applicants' method.

FIG. 7 summarizes the steps of a second embodiment of Applicants' method. Steps 710, 715, 720, and 730, correspond to steps 610, 615, 620, and 625, recited in FIG. 6. In step 735, a processor disposed in each cluster sends/receives a heart beat signal to/from a processor disposed in the other cluster. As described above, the heart beat response interval is between 100 milliseconds and 5 seconds.

In step 737, Applicants' method determines if a cluster failure has been detected, i.e. if a heart beat signal was not received within the heart beat response interval. As those skilled in the art will appreciate, step 737 further comprises retrieving a pre-determined heart beat response interval. In certain embodiments, step 737 is performed by a processor in each cluster.

If Applicants' method determines in step 737 that no cluster failures were detected, then the method transitions from step 737 to step 735 and continues. Alternatively, if Applicants' method determines in step 737 that a first cluster, such as for example cluster 320, has failed, then the method transitions from step 737 to step 740 wherein the method places on standby the device driver, such as device driver 318, disposed in the second cluster, i.e. operational cluster 310, for the first device adapter, such as device adapter 170. In certain embodiments, step 740 comprises loading and initializing that device driver. Steps 745, 750, 755, and 760, correspond to steps 645, 650, 655, and 660, recited in FIG. 6. The device driver loaded and configured in step 740 is subsequently configured in step 755.

The embodiments of Applicants' method recited in FIGS. 6 and/or 7, may be implemented separately. Moreover, in certain embodiments, individual steps recited in FIGS. 6 and/or 7, may be combined, eliminated, or reordered.

In certain embodiments, Applicants' invention comprises instructions residing in memory, such as for example data cache 312 (FIG. 3), and/or NVS 313 (FIG. 3), and/or data cache 322 (FIG. 3), and/or NVS 323, where those instructions are executed by processor 311 (FIG. 3), and/or processor 321 (FIG. 3), to perform steps 620 through and including 660 recited in FIG. 6, and/or steps 720 through and including 760, recited in FIG. 7.

In other embodiments, Applicants' invention comprises instructions residing in any other computer program product, where those instructions are executed by a computer external to, or internal to, system 300, to perform steps 620 through and including 660 recited in FIG. 6, and/or steps 720 through and including 760, recited in FIG. 7. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like While the preferred embodiments of the present invention have been illustrated in detail, it should be apparent that modifications and adaptations to those embodiments may occur to one skilled in the art without departing from the scope of the present invention as set forth in the following claims.

I claim:

1. An information storage and retrieval system comprising:
    a plurality of data storage devices;
    a first device adapter interconnected with said plurality of storage devices;
    a second device adapter interconnected with said plurality of storage devices;
    a first cluster comprising a first processor, a first data cache, an operational device driver for said first device adapter, and a standby device driver for said second device adapter;
    a second cluster comprising a second processor, a second data cache, an operational device driver for said second device adapter, and a standby device driver for said first device adapter; and
    a Remote I/O network interconnecting said first cluster, said second cluster, said first device adapter, and said second device adapter.

2. The information storage and retrieval system of claim 1, wherein said operational device driver disposed in said first cluster is loaded, initialized, and configured; and
    wherein said operational device driver disposed in said second cluster is loaded, initialized, and configured.

3. The information storage and retrieval system of claim 2, wherein said standby device driver disposed in said first cluster is loaded and initialized, but not configured.

4. The information storage and retrieval system of claim 3, wherein said standby device driver disposed in said second cluster is loaded and initialized, but not configured.

5. The information storage and retrieval system of claim 4, wherein said Remote I/O network is capable of transferring data at up to about 500 MBs unidirectionally or bidirectionally.

6. The information storage and retrieval system of claim 4, wherein said Remote I/O network comprises a packet-oriented bus, wherein said packets range in size from 12 to 276 bytes in length including an 8 to 12 byte header, a 4-byte trailing cyclic redundancy check, and 0 to 260 bytes of data payload.

7. The information storage and retrieval system of claim 4, further comprising a Fibre Channel Arbitrated Loop interconnecting said plurality of data storage devices, said first device adapter, and said second device adapter.

8. A method for failover protection in an information storage and retrieval system, wherein said information storage and retrieval system comprises two clusters, two device adapters, and a plurality of data storage devices, comprising the steps of:
    providing a first device driver for a first device adapter and a second device driver for a second device adapter;
    disposing in both clusters said first device driver and said second device driver;
    placing in operation said first device driver disposed in a first cluster;
    placing in operation said second device driver disposed in a second cluster;
    placing in standby mode said first device driver disposed in said second cluster;
    detecting a failure of said first cluster;
    detecting a failure of the second device adapter;
    making operational said first device driver disposed in said second cluster; and
    accessing information stored in said plurality of data storage devices using said first device adapter and said first device driver disposed in said second cluster.

9. The method of claim 8, wherein said accessing step further comprises writing data to one or more of said plurality of data storage devices using said second cluster and said first device adapter.

10. The method of claim 8, wherein said accessing step further comprises reading data from one or more of said plurality of data storage devices using said second cluster and said first device adapter.

11. The method of claim 8, further comprising the step of placing in standby mode the device driver disposed in the first cluster for the second device adapter.

12. The method of claim 8, further comprising the step of monitoring the status of said second cluster by said first processor.

13. The method of claim 12, wherein said monitoring step further comprises the steps of:
    sending an inquiring heart beat signal by said first processor to said second processor;
    receiving said inquiring heart beat signal by said second processor;
    sending by said second processor to said first processor a response heart beat signal;
    receiving said response heart beat signal by said first processor.

14. The method of claim 13, further comprising the steps of:
    setting a heart beat response interval;
    determining by said first processor if a reply heart beat signal was received within said heart beat response interval;
    operative if said first processor did not receive a reply heart beat signal within said heart beat response interval, determining by said first processor that said second cluster has failed.

15. The method of claim 8, further comprising the steps of:
    providing a Remote I/O network;
    interconnecting said first cluster, said second cluster, said first device adapter, and said second device adapter using said Remote I/O network.

16. The method of claim 15, wherein said accessing step further comprises providing data at up to about 500 MBs unidirectionally or bidirectionally between said second cluster and said first device adapter using said Remote I/O network.

17. The method of claim 16, wherein said accessing step further comprises providing one or more information packets using said Remote I/O network, wherein said packets comprise between about 12 to about 276 bytes in length including an 8 to 12 byte header, a 4-byte trailing cyclic redundancy check, and 0 to 260 bytes of data payload.

18. The method of claim 8, further comprising the steps of:
    providing a Fibre Channel Arbitrated Loop;

interconnecting said first device adapter, said second device adapter, and said plurality of data storage devices using said Fibre Channel Arbitrated Loop.

19. An article of manufacture comprising a processor, a memory device, a first device driver, a second device driver, and a computer useable medium having computer readable program code disposed therein to provide failover protection, wherein said article of manufacture is capable of communicating with a first device adapter using said first device driver and with a second device adapter using said second device driver, and wherein said first device adapter and said second device adapter are capable of communicating with a plurality of data storage devices, and wherein said article of manufacture is capable of communicating with a computing cluster, the computer readable program code comprising a series of computer readable program steps to effect:

placing in operation said first device driver;
placing in standby mode said second device driver;
accessing information stored in said plurality of data storage devices using said first device driver and said first device adapter;
detecting a failure of said computing cluster;
detecting a failure of said first device adapter;
making operational said second device driver; and
continuing to access information stored in said plurality of data storage devices using said second device driver and said second device adapter.

20. The article of manufacture of claim 19, wherein said readable program code to continue to access information further comprises a series of computer readable program steps to effect writing data to one or more of said plurality of data storage devices using said second device driver and said second device adapter.

21. The article of manufacture of claim 19, wherein said readable program code to continue to access information further comprises a series of computer readable program steps to effect reading data from one or more of said plurality of data storage devices using said second device driver and said second device adapter.

22. The article of manufacture of claim 19, said computer readable program code further comprising a series of computer readable program steps to effect placing in standby mode said second device driver.

23. The article of manufacture of claim 19, the computer readable program code comprising a series of computer readable program steps to effect monitoring the status of said computing cluster by said processor.

24. The article of manufacture of claim 23, wherein said readable program code to monitor the status further comprises a series of computer readable program steps to effect:

sending an inquiring heart beat signal by said processor to said computing cluster;
receiving a response heart beat signal from said computing cluster.

25. The article of manufacture of claim 24, wherein said readable program code to monitor the status further comprises a series of computer readable program steps to effect:

retrieving a heart beat response interval;
determining by said processor if said response heart beat signal was received within said heart beat response interval;
operative if said processor did not receive said response heart beat signal within said heart beat response interval, determining by said processor that said computing cluster has failed.

26. The article of manufacture of claim 19, further comprising a Remote I/O network interconnecting said article of manufacture, said computing cluster, said first device adapter, and said second device adapter, said computer readable program code further comprising a series of computer readable program steps to provide data at up to about 500 MBs unidirectionally or bidirectionally between said article of manufacture and said first device adapter, and between said article of manufacture and said second device adapter.

27. The article of manufacture of claim 26, said computer readable program code further comprising a series of computer readable program steps to effect providing one or more information packets using said Remote I/O network, wherein said packets comprise between about 12 to about 276 bytes in length including an 8 to 12 byte header, a 4-byte trailing cyclic redundancy check, and 0 to 260 bytes of data payload.

28. A computer program product usable with a programmable computer processor having computer readable program code embodied therein to provide failover protection to an information storage and retrieval system comprising a plurality of data storage devices; a first device adapter interconnected with said plurality of storage devices; a second device adapter interconnected with said plurality of storage devices; a first cluster comprising a programmable computer processor, a first data cache, an operational device driver for said first device adapter, a standby device driver for said second device adapter; a second cluster comprising a second data cache, an operational device driver for said second device adapter, and a standby device driver for said first device adapter; and a Remote I/O network interconnecting said first cluster, said second cluster, said first device adapter, and said second device adapter, comprising:

computer readable program code which causes said programmable computer processor to place in operation said first device driver disposed in said first cluster;
computer readable program code which causes said programmable computer processor to place in standby mode said second device driver disposed in said first cluster;
computer readable program code which causes said programmable computer processor to detect a failure of said second cluster;
computer readable program code which causes said programmable computer processor to detect a failure of said first device adapter;
computer readable program code which causes said programmable computer processor to make operational said second device driver disposed in said first cluster; and
computer readable program code which causes said programmable computer processor to access information stored in said plurality of data storage devices using said second device adapter and said second device driver disposed in said first cluster.

29. The computer program product of claim 28, wherein said program readable program code to access information further comprises computer readable program code which causes said programmable computer processor to write data to one or more of said plurality of data storage devices using said first cluster and said second device adapter.

30. The computer program product of claim 28, wherein said computer readable program code to access information further comprises computer readable program code which causes said programmable computer processor to read data from one or more of said plurality of data storage devices using said first cluster and said second device adapter.

31. The computer program product of claim 28, further computer readable program code which causes said programmable computer processor to monitor the status of said second cluster.

32. The computer program product of claim 31, further comprising:
- computer readable program code which causes said programmable computer processor to determine a heart beat response interval;
- computer readable program code which causes said programmable computer processor to send an inquiring heart beat signal to said second cluster;
- computer readable program code which causes said programmable computer processor to receive a response heart beat signal from said second cluster.

33. The computer program product of claim 32, further comprising:
- computer readable program code which causes said programmable computer processor to determine if said response heart beat signal was received within said heart beat response interval;
- computer readable program code which, if said response heart beat signal was not received within said heart beat response interval, causes said programmable computer processor to determine that said second cluster has failed.

34. The computer program product of claim 28, wherein said information storage and retrieval system further comprises a Remote I/O network interconnecting said first cluster, said second cluster, said first device adapter, and said second device adapter, further comprising computer readable program code which causes said programmable computer processor to provide data at up to about 500 MBs unidirectionally or bidirectionally between said first cluster and said first device adapter, and between said first cluster and said second device adapter.

35. The computer program product of claim 34, further comprising computer readable program code which causes said programmable computer processor to provide one or more information packets using said Remote I/O network, wherein said packets comprise between about 12 to about 276 bytes in length including an 8 to 12 byte header, a 4-byte trailing cyclic redundancy check, and 0 to 260 bytes of data payload.

* * * * *